United States Patent [19]

Bahn et al.

[11] E Re. 28,478

[45] Reissued July 8, 1975

[54] WINDING SUPPORT SYSTEM FOR A DYNAMOELECTRIC MACHINE

[75] Inventors: John J. Bahn; Almy D. Coggeshall, both of Schenectady; Richard T. Maher, Wilton; John B. Waldbillig, Schenectady, all of N.Y.

[73] Assignee: General Electric Company, Schenectady, N.Y.

[22] Filed: June 15, 1973

[21] Appl. No.: 33,808

Related U.S. Patent Documents

Reissue of:

[64] Patent No.: 3,089,048
Issued: May 7, 1963
Appl. No.: 33,808
Filed: June 3, 1960

[52] U.S. Cl. ..... 310/260; 310/231; 310/269; 310/270

[51] Int. Cl. ..... H02k 3/46

[58] Field of Search ..... 310/194, 230, 231, 235, 310/260, 264, 270

[56] References Cited

UNITED STATES PATENTS

| | | | |
|---|---|---|---|
| 1,329,242 | 1/1920 | Hellmund | 171/252 |
| 2,602,829 | 7/1952 | Fromm et al. | 310/260 X |
| 2,724,064 | 11/1955 | Kilner | 310/260 X |
| 2,980,757 | 4/1961 | Coggeshall et al. | 310/260 X |
| 2,994,735 | 8/1961 | Marshall et al. | 310/260 X |

FOREIGN PATENTS OR APPLICATIONS

| | | | |
|---|---|---|---|
| 1,127,805 | 12/1956 | France | 310/260 |
| 1,193,411 | 4/1959 | France | |
| 436,568 | 11/1922 | Germany | |

OTHER PUBLICATIONS

New Large Short Circuit Testing Generators, by C. E. Kilbourne, AIEE paper, No. 52-221, Oct. 1952, pp. 829-836.

*Primary Examiner*—Mark O. Budd
*Attorney, Agent, or Firm*—John F. Ahern; James W. Mitchell

[57] ABSTRACT

*An improved insulating support system for the conducting members of the stator of a dynamoelectric machine. Inner and outer radially spaced support members are secured together with tension members passing among the armature bars so that the entire group of end turns is held as a rigid structure. Conformable pads are used between the bars and the support members to completely support the bars. The support framework is mounted in special brackets to be axially slidable with respect to the stator casing.*

9 Claims, 3 Drawing Figures

INVENTORS
JOHN J. BAHN
ALMY D. COGGESHALL
RICHARD T. MAHER.
JOHN B. WALDBILLIG
BY William C. Cutcher
THEIR ATTORNEY INVENTORS
JOHN J. BAHN
ALMY D. COGGESHALL
RICHARD T. MAHER
JOHN B. WALDBILLIG
BY William C. Crutcher
THEIR ATTORNEY

WINDING SUPPORT SYSTEM FOR A DYNAMOELECTRIC MACHINE

Matter enclosed in heavy brackets [ ] appears in the original patent but forms no part of this reissue specification; matter printed in italics indicates the additions made by reissue.

---

This invention relates to an improved insulating support system for the conducting members of the stator of a dynamoelecric machine and more particularly it relates to an integral end turn support framework for a large generator which is free to move axially as the stator windings expand and contract thermally.

The end turns of a dynamoelectric machine stator are the projecting portions of the armature bars which extend outwardly from longitudinal stator slots. The end turns are necessary in order to reverse the direction of the armature bar and to circumferentially displace the end of the bar so that it can enter a slot almost 180° from the slot from which it emerged. The end turns must also diverge radially from the stator axis in order that they will not obstruct the rotor of the dynamoelectric machine which is turning in the stator bore. Consequently, the stator end turns assume a rather complicated configuration in that they are skewed with respect to the stator axis and lie generally tangentially about a frusto-conical surface of revolution concentric with the stator axis. When there are two separate armature bars in each slot, these being known as "top" (radially inner) and "bottom" (radially outer) bars, one practice is to bend the top bars so that they lie tangentially in one direction about this frusto-conical surface and to bend the bottom bars in the opposite tangential direction about the surface of revolution. The matter is further complicated by the fact that, although the top and bottom bars are closely adjacent at the location where they emerge from the slot, they must spread radially with respect to one another as they move away from the stator so that space will be afforded for a series loop connecting a top bar to a bottom bar.

With this background in mind, it will be appreciated that there are many difficulties in devising a suitable structure for supporting the insulated armature bars in the end turn region. The problem has become more acute with the advent of more rigid thermosetting insulation for the armature bars, which do not yield as freely to conform to the support structure as the older types of insulation, for instance the commonly used asphalt insulation.

The magnitudes of the various forces exerted on the armature bars, both in the slot region of the stator and in the end turn region are substantial. Various magnetic forces will act upon the armature bars of a large turbogenerator, for example during unbalanced load or "short circuit" conditions. In addition, substantial heat is generated by the passage of electric current through the armature bars and, even though effective gas or liquid cooling of the bars is provided, the thermal expansion and contraction of the bars with respect to the stator slots containing them will tend to move the end turns apart in an axial direction with respect to the longitudinal center of the stator.

One support method which has been used extensively to give the strength, yet the yieldability, required of an end winding support system has been to lash the projecting armature bars to a series of circumferential support "hoops." With this method, each bar is individually tied to each loop with a strong flexible cord, such as glass cord impregnated with a resin such as varnish. In a typical construction, there may be around fifty top bars and fifty bottom bars to be lashed to four circumferential hoops at either end of the stator, or on the order of 800 separate ties to be made. It will be appreciated that this is a tedious and time-consuming procedure.

In addition to separately securing the armature bars to a support structure with the foregoing method, they must be separated and secured with respect to one another. One method for accomplishing this is to use small rigid spacer blocks separately lashed to each armature bar. The bars are then tied together, compressing the blocks between bars. Another method is to use a rope member of fiberglass passing around a group of bars with the spacer blocks in alignment.

In U.S. Patent 2,994,735 issued on August 1, 1961 to Walter L. Marshall and Almy D. Coggeshall and assigned to the assignee of the present application, a type of "conformable" spacer block is disclosed as a substitute for a rigid separately lashed block. Another "conformable" spacer block is disclosed in U.S. Patent 2,980,757 issued April 18, 1961, to Almy D. Coggeshall and Harold R. Shirk and assigned to the assignee of the present application.

This slow and expensive method for literally "sewing" the support system together has naturally led to a search for a better arrangement. Two of the greatest problems to be overcome were as follows:

First, there is a slight variation both in bar cross-section and in bar configuration which is unavoidable in manufacture, especially in the end turn portions which must follow the complicated involute configuration described above.

Secondly, a support structure which rigidly fixes the end turns to the stator itself restricts the thermal expansion and contraction of the armature bars in the slots.

Accordingly, one object of the present invention is to provide an improved end winding support system which holds the end turns in a rigid framework yet which allows thermal movement of the framework.

Another object is to provide a conforming framework which adjusts itself to irregularities of conducting members while locating them with respect to one another.

Another object is to disclose a special axially slidable support bracket suitable for permitting axial movement of an end turn supporting framework with respect to the stator itself.

Another object is to provide an improved mounting for a segmental baffle plate restricting the flow of coolant to the "air gap."

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawing in which:

Generally stated, the invention is practiced by providing inner and outer radially spaced support members secured together with tension members passing among the armature bars so that the entire group of end turns is held as a rigid structure. "Conformable" pads are used between the bars and the support members to completely support the bars. The support framework is mounted in special brackets to be axially slidable with respect to the stator casing so that thermal "breathing" can take place. The inner support members serve as a mounting structure for a segmented "air gap" baffle.

Figure 1:
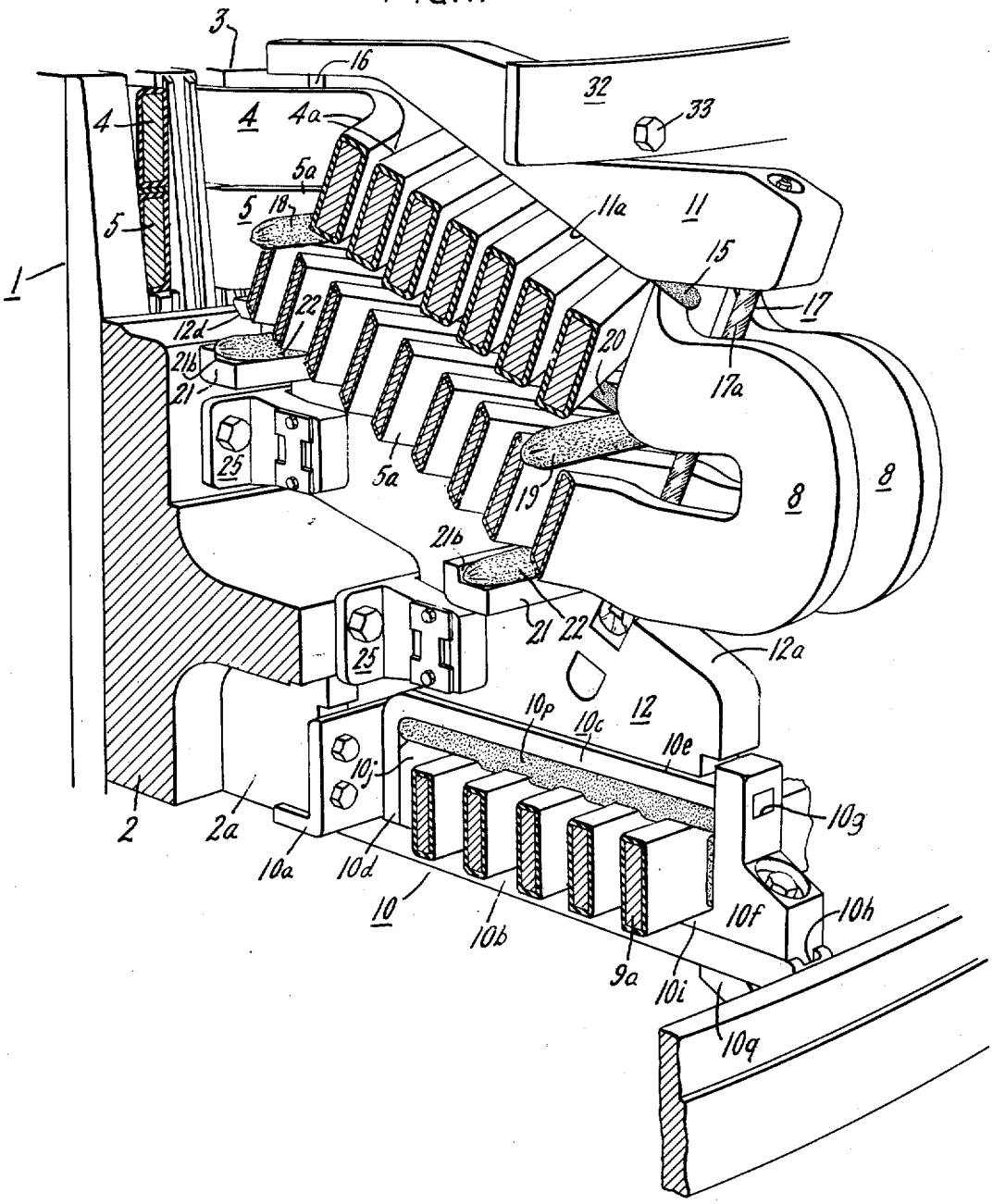
FIG. 1 is a perspective fragmental view showing the lower part of one end of the stator, illustrating the disposition of the armature bars with respect to the stator.
Figure 2:
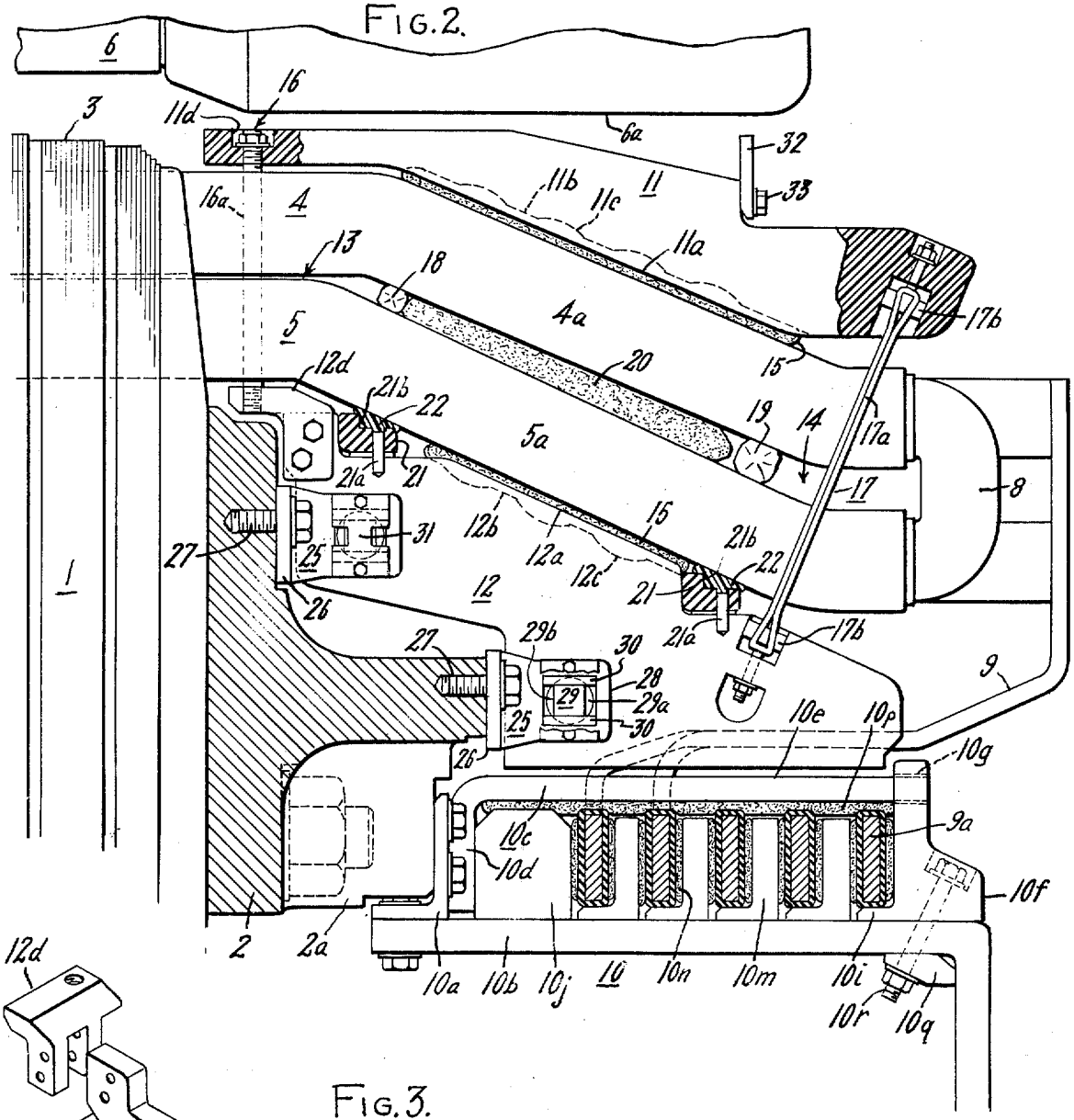
FIG. 2 is a horizontal elevation, partly in section, showing the support system at one end of the generator stator.

Referring now to FIG. 1 of the drawing, a perspective view is shown of a portion of a stator 1 which includes a circumferential flange ring seen at 2. The rotor (not shown) turns in bore 3 shown near the top of FIG. 1. As will be familiar to those skilled in the art, the main structural members of the stator including the flange ring 2 and other support members (not shown) enclose and support a large number of slotted core laminations defining the stator central bore 3 and through which pass the slot-lying portions of top armature bars 4 and bottom armature bars 5. Top bars 4 bend both circumferentially and radially as they come out of the slot and continue in an involute curve as shown at 4a in FIG. 1. Similarly bottom bars 5 also diverge radially but in an opposite circumferential sense as seen at 5a. Thus these portions 4a and 5a are both "skewed" with respect to the stator axis, as will be plain from the perspective view in FIG. 1. A clearer understanding may be had by reference to the horizontal elevation of FIG. 2. There the bar portions 4a, 5a have been rotated into the plane of the drawing, although it is understood that actually they run in opposite circumferential directions as well. Portions 4a, 5a are bent in an involute-type configuration so as to lie tangentially to a frusto-conical surface of revolution taken about the stator axis. FIG. 2 also shows a portion of the generator rotor 6 which rotates in bore 3 of the stator.

A top bar on one side of the stator circumference is connected with a bottom bar approximately diametrically opposite, this connection being made with a "series loop" 8. It will be understood that series loop 8 is rotated into the plane of the drawing in FIG. 2 in order to show the proper spacing of the members in a radial direction and that it does not actually connect the portions 4a and 5a emerging from the same slot.

At intervals about the stator circumference, power is withdrawn from the armature windings through flexible leads 9 passing to circumferential collecting rings one of which is shown at 9a. Collecting rings 9a, in turn, are connected to the high voltage outlet terminals (not shown).

The support structure holding collecting rings 9a in position is shown generally at 10. Several such collecting ring support structures 10 are circumferentially spaced about the stator outside of the end turns and are attached to circumferential flange 2 by bolting or welding to radial webs 2a preferably made integral with the circumferential flange 2.

The collecting ring support structure is supported by means of a flange member 10a, the under side of which is bolted to an axially extending lower member 10b. An upper angle piece shown generally at 10c has a short leg 10d abutting the face of member 10a to prevent its movement toward the stator and a long leg 10e passing over the collecting rings 9a and substantially parallel with lower member 10b. The long leg 10e is supported in a sliding support 10f by means of a hole 10g receiving the end of long leg 10e. Sliding support 10f is free to move transversely to collecting rings 9a by virtue of its lower side being mounted to slide in a groove 10*h* in lower member 10b. The sliding support 10f also has a lower flange 10i which supports the first collecting ring 9a.

A spacer block 10j is disposed between the innermost collecting ring and short leg 10d. Thus it will be apparent that if support block 10f is moved toward the stator, all of the collecting rings 9a will be constricted between support 10f and spacer 10j. Interposed between each collecting ring 9a is an angle piece 10m, the lower leg of which supports the outside of the collecting ring. Between each collecting ring and the long leg of angle pieces 10m are disposed pads of conformable material 10n. These are preferably composed of insulating material and should be resilient or pliable in order to conform to irregularities of the collecting rings. Pads 10n are preferably composed of thermosetting material so that the resin may be cured after the collecting ring framework has been constricted about the collecting rings. An additional pad of conformable material 10p is disposed between the tops of the collecting rings and upper member 10c.

The means for constricting the support so as to cause pads 10n, 10p to conform are comprised of a beveled washer 10q held by a diagonal bolt 10r passing through sliding support 10f as shown. Thus when bolt 10r is tightened, the component of force produced transverse to the collecting rings will cause sliding support 10f to move toward spacer 10j, causing pads 10n, 10p to conform to the shape of the rings.

Turning now to the support system for the armature end windings, the top bar extending portions 4a and the bottom bar extending portions 5a are held by inner support members 11 and outer support members 12. These inner and outer support members 11, 12 are circumferentially spaced about the stator bore and extend generally axially and radially outward therefrom. Thus members 11, 12 are disposed substantially coplanar with the stator axis. In the embodiment shown, there is a pair of support members 11, 12 for each three stator slots. Inner support members 11 define support surfaces 11a which lie parallel to the frusto-conical surface of revolution, i.e. each surface 11a of an inner support member 11 diverges as the element of a cone from the stator axis while the bar portions 4a cross it diagonally. Similarly, the outer support members 12 define support surfaces 12a which also diverge as elements of a cone from the stator axis while bar portions 5a cross it diagonally. Surfaces 11a, 12a are not exactly parallel but must diverge radially from one another slightly so as to allow for the fact that the radial spacing between top and bottom bars near the slot, as shown at 13, is less than the radial spacing between top and bottom bars at the series loop, as shown at 14.

Inner and outer support members 11, 12 are preferably constructed of high strength insulating material. A suitable material for this use is "Permali," which is the trade name of a laminate constructed of thin wood veneers bound with a synthetic thermosetting resin and sold by Permali, Inc.

Surfaces 11a, 12a of support members 11, 12 are furnished with longitudinal grooves 11b, 12b respectively. The grooves may vary in depth as indicated at 11c, 12c to form a lock or key as will be amplified at a later point. Disposed in grooves 11b, 12b and extending above surfaces 11a, 12a are elongated pads of thermosetting resin 15. These are placed in the grooves during assembly in an uncured or pliable state and several suitable compositions are commercially available, such as the thermosetting resin sold under the trade name "Glaskyd 1901" by Perrysburg Laboratories. This material has the ability to cure to a rock-like hardness at an elevated temperature and possesses both good compressive strength and good insulating qualities.

Inner and outer support members 11, 12 are securely fastened to one another by tension members illustrated by a bolt 16 and a special insulating tension member 17. Member 17 may be manufactured as disclosed in U.S. Patent 3,024,302, issued on March 6, 1962, to Almy D. Coggeshall and further reference will not be made to it herein, except to note that it consists of a glass rope 17a impregnated with thermosetting resin and secured to T-shaped adjustable bolts 17b.

The bolt 16 may be considered to represent any suitable tensioning means, but as shown here comprises a steel rod 16a threaded at one end into a bracket 12d secured to outer support 12 and secured at the other end to inner support member 11 in a recess 11d cut therein. FIG. 1, that several extending portions 4a, 5a cross a tions 4a, 5a of the armature bars, spacers 18, 19, 20 of tween support members 11, 12 pulling them toward one another and thus compressing the pads of thermosetting material 15. In other words, the support members 11 are forced radially outward and the support members 12 are forced radially inward. It will be reemphasized at this point, as more clearly illustrated in FIG. 1, that several extending portions 4*a*, 5*a* cross a pad 15 diagonally and, since the pads are pliable or "conformable," the bars will depress them at the point where each armature bar crosses a support member.

In order to provide a radial separator between portions 4*a*, 5*a* of the armature bars, spacers 18, 19, 20 of a suitable rigid insulating material are employed and are interposed between portions 4a, 5a. These take the compressive load between portions 4*a*, 5*a* applied by tension members 16, 17. Arcuate spacer 19 is of a greater thickness than arcuate spacer 18 in order to provide for the radial divergence of the top bars with respect to the bottom bars. Radial spacers 20, aligned with support members 11, 12 may also be employed. These spacers 18, 19, 20 may be pads of thermosetting material as described previously or may be of other suitable insulating material.

In order to provide additional circumferential or lateral support for the spaced outer support members 12, rigid insulating hoops 21 are employed which are secured to support members 12 by suitable means such as pins 21a. Hoops 21 each have a circumferential groove 21b in which are placed additional pads of thermosetting resin 22, which may also be of the Glaskyd 1901 composition. Pad 22 is also in its uncured, pliable state during assembly.

All of the conforming pads 10n, 10p, 15, 18, 19, 20 and 22 mentioned herein may be enclosed in prestretched rubber sleeves to add to their conforming properties as more particularly described in the aforementioned U.S. Patent 2,994,735, which is assigned to the assignee of the present application.

The hoops 21 are all preferably high strength rigid insulating members. A suitable material for their construction is fibrous glass bonded with a thermosetting polyester resin molded to the cross-sections shown and cured.

The foregoing inner and outer support members 11, 12, tension members 16, 17, spacers 18, 19, 20 and hoops 21 together constitute a support framework or "cage" which can be constricted about the bars to hold the end turn portions firmly in position. The framework, as it is constricted, conforms to irregularities in the bars by virtue of the "uncured" or pliable thermosetting pads, although resilient pads might also be employed. When the framework is tightly secured about the end turns, it may be considered substantially rigid.

Figure 3:
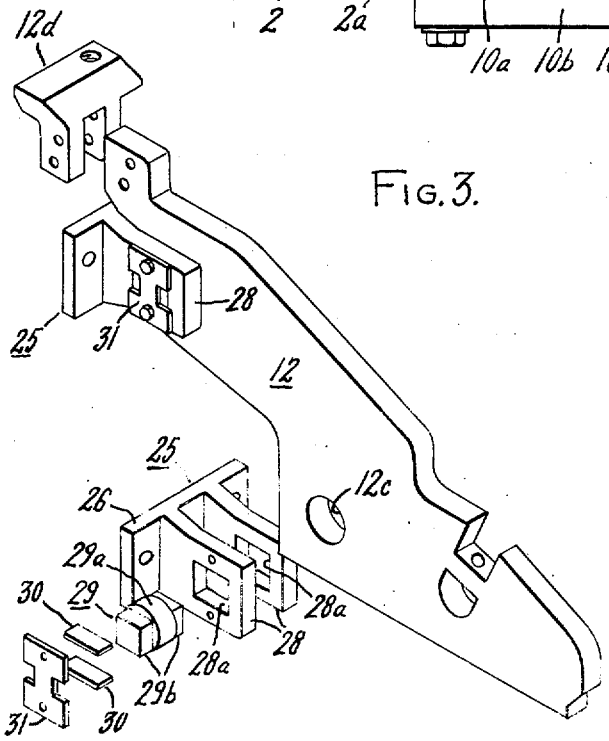
FIG. 3 is an exploded detail view of the support bracket which holds the framework for axial movement.

In order to permit this rigid framework to move axially with thermal expansion and contraction of the slot-lying portions of the armature bars, special support brackets 25 are used to secure the outer support members 12 to stator flange 2. Reference to FIGS. 2 and 3 of the drawing will show that the bracket comprises a base 26 secured to flange 2 by suitable means such as bolts 27. Base 26 supports a bifurcated portion consisting of extending parallel flanges 28, which each define a rectangular recess 28a. Outer support member 12 is held between extending flanges 28 by means of a special pin 29. The central portion 29a of pin 29 is cylindrical and fits with close clearance in a cylindrical recess 12c of the support member 12. The two ends 29b of pin 29 have a rectangular cross-section and extend into recesses 28a of flanges 28 on either side of the support member.

Friction-reducing bearing pads 30 are arranged in recess 28a above and below the pin end portions 29b so that portion 29b fits snugly between them, while allowing the pin to slide in an axial direction. Bearing pads 30 serve to reduce the sliding friction and a suitable material for pads 30 is a "self-lubricating" Teflon substance sold as "Chemloy 770–07–19" by Crane Packing Company. Cover plates 31 complete the bracket and prevent the pads 30 from coming out of the recesses 28a and also force the sides of the pads 30 against the outer support member 12 to provide a damping or "snubbing" action.

It will, of course, be noted that the axial length of recess 28a is greater than the corresponding axial dimension of rectangular portion 29b of the pin. This difference in dimension allows the pin, carrying with it support member 12, to slide to and from the generator flange 2 in an axial direction. Thus brackets 25, supporting the members 12 by pins 29, constitute means supporting the framework for axial movement with respect to the stator. Two such support brackets 25 are used to secure each outer support member 12. The purpose of the cylindrical portion of the pin 29 is to allow the brackets 25 to rotate on members 12 to compensate for any slight misalignment of the brackets or for variations in the large circumferential mounting flange 2.

The inner support members 11 serve as a means for supporting the "air gap" baffle 32. The air gap baffle is used to restrict the flow of cooling gas between the end turns and a retaining ring 6a forming a portion of the rotor. Previous constructions have necessitated attaching the air gap baffle to the stationary stator structure inasmuch as the end turn support structure was composed primarily of lashing and serve no means for supporting the air gap baffle. With the improved end turn support system described, the air gap baffle 32 is constructed in arcuate segments which are attached to radially inner support members 11 by means of bolts 33. Arcuate members 32 together form a ring about the rotor defining clearances with the rotor retaining ring 6a to restrict the flow of coolant. It will be observed that baffle plate 32 moves axially along with the end winding support system when the windings expand and contract thermally. Since the outer surface of retaining ring 6a is cylindrical, such axial movement does not affect the clearance space between baffle 32 and retaining ring 6a.

The method of assembly and operation of the improved end winding support system will now be described. The support brackets 25 may be attached to outer support member 12 as a sub-assembly by aligning the holes 12c between the flanges 28 and inserting the pins 29 through recess 28a. The cylindrical portion 29a of the pins is small enough to pass through recess 28a before the pads 30 are inserted. The pads 30 are then inserted and cover plates 31 are attached. The width of pads 30 is slightly greater than the thickness of flanges 28. Thus cover plates 31 force bearing pads 30 inward slightly beyond the inner surface of flanges 28 so that the edges of the bearing pads also serve to prevent rubbing of the outer support member 12 against the inner surfaces of flanges 28 as the support member moves.

For one method of assembly the brackets 25 holding support members 12 are then individually bolted to flange 2. The rings 21 are then put in place using pins 21a and thermosetting pads 15, 22 inserted in their respective grooves.

In an alternate method of assembly, the entire outer cage comprising support members 12, brackets 25, rings 21, etc., may be pre-assembled in a large jig and then the jig moved to the end of the generator stator. Here the bearing brackets 25 are bolted to flange 2 with bolts 27.

The bottom bars 5 are inserted and held in place temporarily, after which the top bars 4 are inserted, separating them with rings 18, 19, 20. As the assembly proceeds, the inner support members 11 are aligned radially with and secured to the outer support members 12. The tension members consisting here of bolt 16 and insulating member 17 are attached and drawn up snugly, depressing the conformable pads 15, 22 where the armature bars cross the supports. The foregoing procedure is carried out until the entire cage or framework has been assembled on both ends of the stator. Additional tightening of the tension members may then be required to completely remove any looseness as the conformable pads 15, 22 adjust for any misalignment or irregularities. Likewise, the cylindrical central portions 29a of pins 29 allow angular adjustment due to irregularities in flange 2. For most installations, variously disposed compression blocks or separators (not shown) may be required to provide desired separation between bars. A very effective block is a "conformable" block such as described in the aforementioned U.S. Patent 2,980,757. Rigid blocks may also be employed, however, which may be separately lashed to the bars or held in place by a single lashing passing around a group of bars.

After all of the tension members 16, 17 have been taken up snugly, the entire stator is placed in a curing oven and the temperature is raised to cure the thermosetting resin in pads 15, 17, 18, 19, 20, 22. Upon completion of the curing cycle, the resin is cured to a rock-like hardness, with permanent indentations where the armature bars intersect with the support members. This results in a "conformed" framework or molded cage holding the armature bars rigidly in position. Of course, if resilient pads are used instead of thermosetting pads, this curing step will be unnecessary.

It may also be noted that, prior to the curing and while the tension is being applied by members 16, 17, pads 15 are also squeezed into the recesses 11c, 12e in the bottom of grooves 11b, 12b. Then when the pads 15 cure, these portions squeezed into recesses 11c, 12c form a "lock" preventing pads 15 from sliding longitudinally along the support member.

The air gap baffle segments 32 may be attached later after the rotor of the generator is in position.

In operation, the entire framework encasing the end turns is free to move axially in response to thermal expansion and contraction of the slot portions of the bars by virtue of the pins 29 sliding axially in brackets 25. This serves to prevent setting up any stresses in the armature bars which may tend to crack the insulation. Pins 29, however, prevent any radial movement of the end turns which may result from magnetic forces imposed on the windings.

The ease of assembly compared to previous methods of assembly constituting individual lashing of the armature bars will be readily apparent. The structure outlined provides a molded cage which exactly conforms to the configuration of the end turns and yet which allows the complete end turn structure to move axially when the armature bars are heated. It will be observed that the end turn portions of the bars are also free to expand along their own lengths in respone to an increased temperature, since the bars merely expand longitudinally through the permanent indentations formed in the thermosetting pads.

The collecting ring support structure is, of course, fixed to the stator and needs no provision for thermal movement. The flexible leads 9 allow for relative movement between the end turn framework and the collecting ring framework.

One possible modification of the invention would be to support the inner support members 11 instead of outer support members 12 from the stator for axial movement therewith, or perhaps to support both the inner and outer support members for axial movement. Such modifications are naturally within the scope of the invention. Various substitutions may be made for the tension means represented by bolt 16 and member 17. In place of brackets 25, axial pins attached to either support members 12 or flange 2 and sliding in holes in the opposite members would provide a suitable axially slidable support. The invention is also applicable to stators having one, three, or more, armature bars in each slot rather than the two armature bars in the embodiment shown.

While there has been described what is at present considered to be the preferred embodiment of the invention, it will be understood that other modifications may be made therein, and it is intended to cover in the appended claims all such modifications as fall within the spirit and scope of this invention.

What we claim as new and desire to secure by Letters Patent of the United States is:

1. A winding support system comprising a stator having a group of transversely spaced insulated conducting members, *extending beyond respective ends of said stator and diverging radially outwardly from the axis of said stator thereat*, framework means constrictable in a direction transverse to said *radially diverging* conducting members comprising first and second substantially parallel *axially disposed* support members disposed on either side of said group of conducting members, *crossing said conducting members at an angle*, said first support members being supported by said stator and said second support members each being movable relative to one another, first means connected between said first and second support members for constricting the framework, and a plurality of conformable pads of thermosetting material disposed between adjacent conducting members and between outer conducting members and the support members, whereby the framework means can be constricted with the first means and the conformable pads cured to hold the conducting members in ridigly spaced relationship.

2. A stator end winding support comprising a stator having at least one row of circumferentially spaced armature bars projecting beyond the stator end *and diverging radially outwardly thereat* said armature bars being subject to thermal expansion and contraction in an axial direction, constrictable framework means including a plurality of first and second support members lying radially inward and outward of and crossing said armature bars at an angle, said first support members being movable with respect to one another, a plurality of conformable pads of thermosetting material disposed at the intersections of the inner and outer support members with the armature bars, means connected between said first and second support members to constrict the framework about the armature bars, whereby the thermosetting conformable pads can be depressed to conform to the bars, and means supporting said framework from the stator for substantially unrestrained axial movement therewith, whereby the projecting armature bars are held in a rigid cage which is axially slidable to compensate for thermal expansion and contraction of the armature bars with respect to the stator.

3. A stator end winding support comprising a stator having at least one row of circumferentially spaced armature bars projecting beyond the stator end and [ skewed ] *diverging radially outwardly thereat* with respect to the stator axis, said armature bars being subject to thermal expansion and contraction in an axial direction, a plurality of circumferentially spaced first support members projecting from the stator coplanar with the stator axis and crossing said armature bars at an angle, a plurality of circumferentially spaced second support members disposed on the other side of the armature bars from said first support members and substantially radially aligned with the first support members, tension means connecting the inner and outer support members with one another for rigidly supporting the intersecting armature bars therebetween, and second means supporting at least the first support members from the stator for substantially unrestrained axial movement therewith, whereby the projecting armature bars are held in a rigid framework which is axially slidable to compensate for thermal expansion and contraction of the armature bars with respect to the stator.

4. A stator end winding support comprising a stator having at least one row of circumferentially spaced armature bars projecting beyond the stator end and [ skewed ] *diverging radially outwardly thereat* with respect to the stator axis, said armature bars being subject to thermal expansion and contraction in an axial direction, a plurality of circumferentially spaced first support members projecting from the stator coplanar with the stator axis and crossing said armature bars at an angle, a plurality of circumferentially spaced second support members disposed on the other side of the armature bars from said first support members and substantially radially aligned with the first support members, a first group of conformable thermosetting pads disposed between the first support members and the armature bars, a second group of conformable thermosetting pads disposed between the second support members and the armature bars, adjustable tension means securing the inner and outer support members together for constricting the support members to depress the thermosetting pads against the armature bars where they cross the first and second support members, and means supporting at least the first support members from the stator for substantially unrestrained axial movement therewith, whereby the projecting armature bars are held in a rigid framework which is axially slidable to compensate for thermal expansion and contraction of the armature bars with respect to the stator.

5. A stator end winding support comprising a stator having circumferentially spaced longitudinal winding slots therein, a circumferential row of bottom armature bars *having slot-lying portions* disposed in said slots [ and ] *, said bottom armature bars* projecting beyond the stator end [ , said bottom bars each being displaced ] *and each extending* circumferentially from the slot and diverging radially from the stator axis, a circumferential row of top armature bars *having slot-lying portions* disposed in said slots [ and ] *, said top armature bars* projecting beyond the stator end [ , said top bars being displaced ] *and each extending* circumferentially in an opposite sense from the bottom bars and diverging radially from the stator axis, a plurality of circumferentially spaced first support members projecting from the stator substantially coplanar with the stator axis and defining surfaces diverging radially therefrom and uniformly spaced from one row of armature bars, a plurality of circumferentially spaced second support members projecting from the stator coplanar with the stator axis on the opposite side of the bars from the first support members and radially aligned with said first support members, said second support members defining surfaces diverging radially from the stator axis and uniformly spaced from the other row of armature bars, circumferential separating means disposed between the top and bottom bars, a first group of conformable pads disposed in the spaces between the first support members and the bars, a second group of conformable pads disposed in the space between the second support members and the bars, adjustable tension means securing the first and second support members together for squeezing the pads against the armature bars, and support bracket means connected between said first support members and the stator, to allow axial movement of the first support members with respect to the stator, whereby the projecting armature bars are held in a rigid framework which is axially slidable to compensate for thermal expansion and contraction of the armature bars with respect to the stator.

6. The combination according to claim 5 wherein the brackets each comprise a stationary member secured to the stator including a bifurcated flanged portion axially enclosing a part of a first support member, pin means passing through holes defined by the first support member and the bifurcated flange and axially slidable within said flange holes, and friction reducing pads supporting the pin means for axial movement in the flange.

7. The combination according to claim 5 wherein circumferential hoop members are secured to said circumferentially spaced first support members to provide lateral support therefor, and conformable pads are disposed between said hoop members and the armature bars adjacent said first support members.

8. The combination according to claim 5 wherein a plurality of arcuate baffle segments are disposed on said support members radially inward from said top armature bars in circumferential alignment, whereby said baffle segments together define a baffle ring radially inward from the end turns.

9. For use on a dynamoelectric machine stator having a circumferential structural member supporting the end turns of the stator winding, the combination of a plurality of axially spaced collecting rings electrically connected to said end turns, first stationary means restraining said collecting rings in an axial direction, a plurality of rigid spacer means interposed between said collecting rings, second means movable in an axial direction relative to one another and with respect to said first means and transversely to the collecting rings, a plurality of conformable thermosetting pads disposed between the collecting rings and said spacer means, and third adjustable means causing the second means to move toward the first stationary means constricting the thermosetting pads to hold the collecting rings in a rigid framework.

* * * * *